Figure 1:
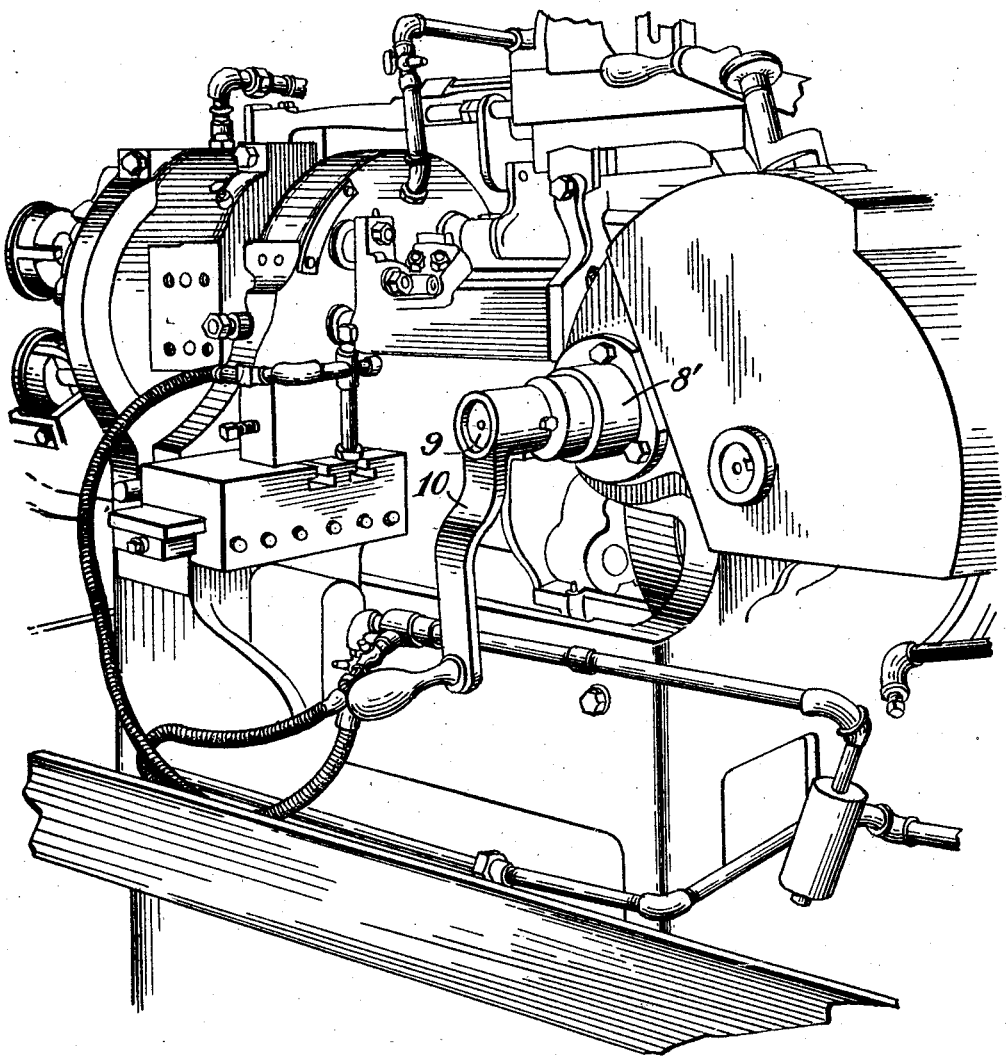

Nov. 20, 1928.

C. W. SIMPSON 1,692,315

CRANK HANDLE SAFETY DEVICE FOR MULTIPLE SPINDLE SCREW MACHINES

Filed Sept. 26, 1927    2 Sheets-Sheet 1

Inventor

C. W. Simpson

By his Attorney

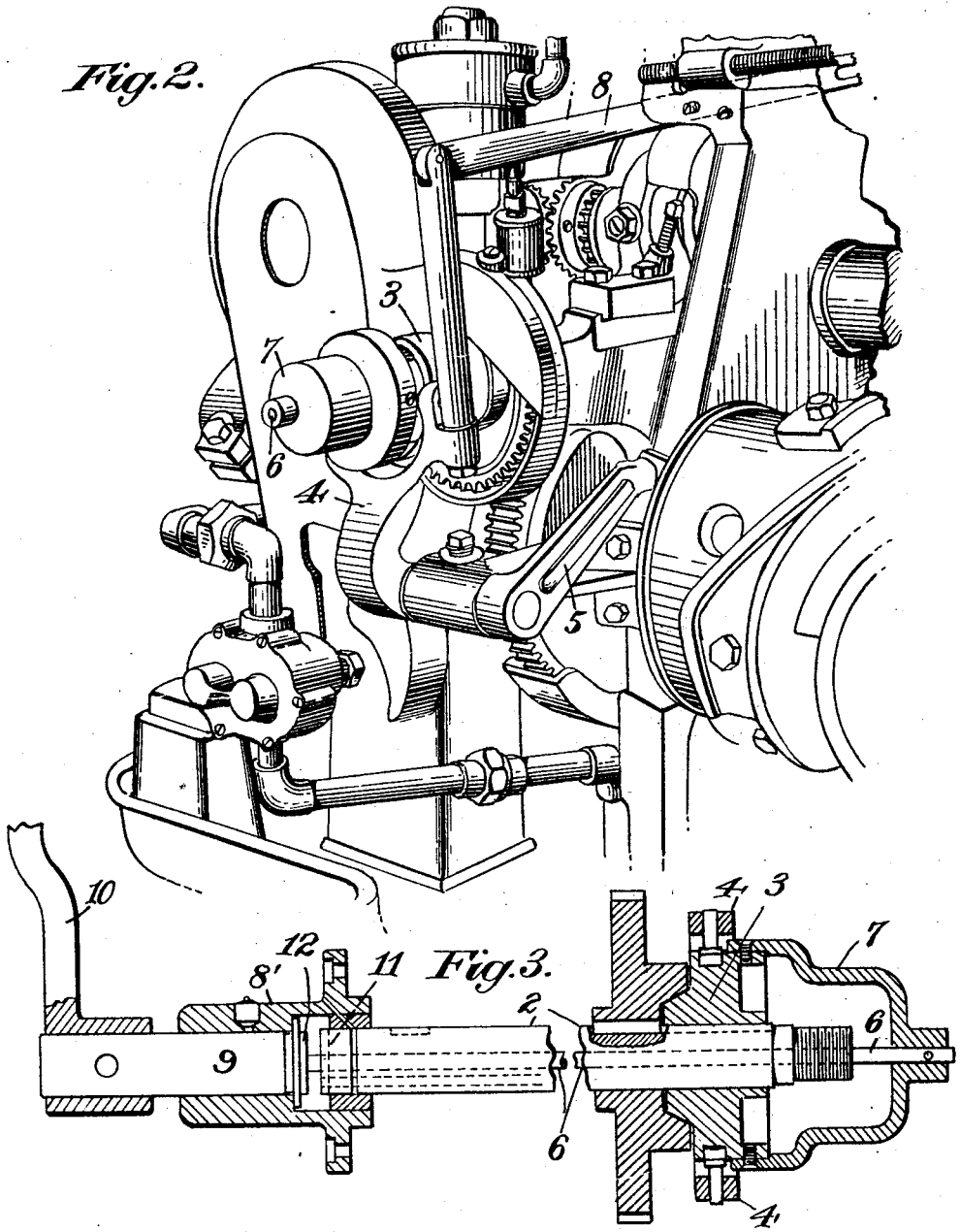

Patented Nov. 20, 1928.

1,692,315

UNITED STATES PATENT OFFICE.

CHARLES W. SIMPSON, OF WINDSOR, VERMONT, ASSIGNOR TO THE NATIONAL ACME COMPANY, OF CLEVELAND, OHIO, A CORPORATION OF OHIO.

CRANK-HANDLE SAFETY DEVICE FOR MULTIPLE-SPINDLE SCREW MACHINES.

Application filed September 26, 1927. Serial No. 222,160.

This invention has for its object the provision of a crank handle safety mechanism for use with power driven and manually operated shafts in connection with which a clutch is used for transmitting power to the shaft and particularly to the feed shafts used in automatic screw machines, such as the Gridley.

One of the objects of the invention is the provision of safety mechanism which is practical and easy to install on machines already marketed, with a minimum of labor and parts, and which cannot fail to function, and is simple and inexpensive to manufacture.

A further object of the invention is the provision of a safety mechanism which makes its unnecessary to remove the crank but which automatically operates to prevent the operation of the power driven shaft by the crank at predetermined times.

In automatic screw machines, a power operated clutch driven shaft is used and this is rotated at high speed, the clutch of which is thrown into operative and inoperative positions automatically and the operation of this clutch is also manually controlled. Frequently it is necessary to turn over the mechanism of the machine by rotating this shaft through the medium of a crank handle placed on the end thereof and should the clutch at this time be accidently thrown into operative position, serious injury not infrequently results to the operator.

The operator at the time of placing the hand crank upon the shaft must exercise care that the clutch is not engaged since if it is the crank may be caused to slide from the shaft or be pulled from the operator's hand to the injury of the arm or person of the operator.

Therefore it is highly desirable to provide a safety mechanism which will prevent the operation of this shaft by the crank handle when the clutch is engaged, and to provide a mechanism of this kind which is simple, inexpensive to manufacture, comprising a minimum of parts whereby it can be readily and quickly installed and cannot fail to function, and which is fool-proof.

In the drawings accompanying and forming a part of the specification, Fig. 1 illustrates one side of a Gridley multiple spindle automatic screw machine having this improved safety mechanism attached thereto; Fig. 2 illustrates the opposite side thereof and Fig. 3 is a view of the feed shaft and safety mechanism applied thereto, a part of said view being in section.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In automatic screw machines, particularly of the multiple spindle variety, such as the Gridley, a power operated feed shaft is used to drive the cam shaft and this feed shaft is located transversely of the machine for transmitting power to certain of the mechanisms. At one end of this shaft 2 a clutch 3 is located, one member of which is fixed to the shaft, while the other member is loose thereon, but is connected with a suitable source of power, this last clutch member being thrown into and out of engagement with the fixed clutch member, thereby to rotate the shaft 2 by means of a suitable yoke 4 automatically controlled by a lever 5 operated by a suitable cam on the cam shaft. This yoke 4 is also operated by a hand lever 8 suitably connected with the yoke so that at certain times the clutch may be thrown into and out of operative position by this hand lever while during the normal operation of the machine the clutch is automatically operated from the cam shaft.

In the present improvement a hollow feed shaft 2 is substituted for the regular solid shaft heretofore used, and this feed shaft carries the usual worm meshing with the worm wheel of the cam shaft, and by means of which the cam shaft is driven. Within this hollow shaft 2 is located a sliding push rod 6 passing freely through the hollow shaft from end to end thereof. On one end of this rod 6 is pinned a cup-shaped casting or dome 7 and this dome receives, and is secured to the loose member of the clutch whereby the dome 7 and rod 6 are shiftable with this clutch member when it is moved back and forth by the yoke 4. At the opposite end of the shaft 2 a housing 8' is provided containing bearings for one end of the shaft 2 and the inner end of an alined short shaft 9 to which a crank 10 is permanently secured. The end of the hollow shaft 2 is provided with a transverse slot or groove 11 and the adjacent end of the shaft 9 is provided with a transverse tongue 12 adapted to fit into said groove 11 at a predetermined time.

To install this improved safety device it is merely necessary to face mill, drill and tap the boss on the gear box to accommodate the shaft housing 8' and to turn down, drill and tap the clutch body to fit the dome or cup 7. The hollow feed shaft 2 is then substituted for the standard feed shaft; the housing with the short shaft 9 and bushing in place is then bolted to the gear box; the push rod 6 is inserted into the hollow shaft; and the dome screwed in place upon the clutch body. The crank 10 heretofore loose upon the shaft is permanently fastened to it by a tapered pin.

In the operation of this improved safety device, when the clutch is out the body or loose member of the clutch is thrown back or shifted, which likewise pushes back the dome 7 and withdraws the push rod 6 so that its opposite end is back of the cross slot 11 in the end of the hollow shaft 2. This permits the tongue 12 of the short shaft 9 to engage this slot 11 in the hollow shaft when the short shaft is pushed in by the operator. Thus this tongue 12 and groove or slot 11 form a clutch, and in this position connect the short shaft and the hollow shaft so that the operator may rotate the shaft 2 by the hand crank 10 in the usual way. In the operation of the machine, just as the danger point is reached, at which the high point of the cam is passed and the high speed power feed comes into action, the crank shaft or short shaft 9 is automatically disconnected from the hollow shaft so that the crank 10 ceases to function so far as turning the shaft 2 is concerned. In other words, as the power driven clutch member connected to the dome 7 is thrown into operation automatically the movement of this clutch member and dome carries with it the sliding rod 6, the end of which passes beyond the slot 11 so as to engage the end of the crank shaft 9 and disconnect it from the shaft 2, the end of this push rod bearing against the center of the tongue on the crank shaft, thus forcing the tongue out of the groove of the hollow shaft 2 and so completely disconnects the shaft 9 and the hollow shaft 2. The throw of the clutch is sufficient so that some time before the friction takes hold the tongue 12 is clear of the groove 11 thus giving a margin of safety between the disconnection of the hand mechanism and the going into action of the power feed.

The action of the mechanism from the standpoint of the operator is as follows: He revolves the machine by hand through the medium of the crank 10 in the regular way, paying no attention to the location of the high point while doing so. After several revolutions by hand the crank is pushed slightly toward him by the rod 6 and then turns freely without driving anything or being driven and a moment later the power feed comes into action. When the operator lets go of the crank it hangs free, it not being necessary to remove it from its shaft as heretofore and therefore it can be pinned to its shaft 9 where it is always in position for use. Thus when the clutch members are brought into engagement, either automatically or by means of the lever 8, the crank shaft 9 with the crank handle 10 thereon is automatically and positively disengaged from the shaft 2 so that there is no danger to the operator.

In practice it has been found that occasionally, when the machine happens to be stopped with the cam roll on the high point of the lead cam of the cam shaft, it is difficult to disengage the clutch, as it is positively locked. However, by the installation of a suitable spring between the inner wall of the dome 7 and a small collar pinned to the rod 6, the operator is enabled to crank the machine backward by slightly pushing on the crank handle fixed to the rod 6 and thus compress the spring, which allows the dog clutch to slightly re-engage without in any way interfering with the effective operation of this improved safety mechanism.

From the foregoing it will be observed that I have thus provided a very simple, compact, inexpensive and easily installed safety mechanism which will positively disconnect the crank from the feed shaft when the clutch is thrown into operation.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a machine having an automatically operated clutch comprising a fixed and a shiftable member and means for operating it, the combination of a feed shaft, a sliding crank handle shaft, said shafts having an interlocking connection, a sliding push rod connected with the shiftable member of the clutch and in position to engage the crank shaft thereby to slide the crank shaft out of engagement with the feed shaft when the clutch is thrown into operation.

2. In a machine having an automatically operated clutch comprising a fixed and a shiftable member and means for operating it, the combination of a hollow feed shaft, a sliding crank handle shaft, said shafts having a clutch connection therebetween, a push rod carried by the hollow shaft and connected with the shiftable member of the clutch and in position to engage the crank shaft thereby to slide the crank shaft out of engagement with the hollow feed shaft when the clutch is automatically thrown into operation.

3. In an automatic multiple spindle screw machine, the combination of a transverse hollow feed shaft, an automatically operated clutch comprising a fixed member and a shiftable member, means for shifting it, a sliding crank handle shaft in juxtaposition to the end of said feed shaft, said shafts having a clutch connection therebetween, a push rod carried by the hollow shaft and connected with the shiftable member of the clutch and in position to engage the crank shaft thereby to slide the crank shaft out of engagement with the hollow feed shaft when the clutch is automatically thrown into operation.

4. In an automatic multiple spindle screw machine, the combination of a transverse hollow feed shaft, an automatically operated clutch comprising a fixed member and a shiftable member, means for shifting it, a sliding crank handle shaft in juxtaposition to the end of said feed shaft, said shafts having a clutch connection therebetween, a push rod carried by the hollow shaft, a dome connected with said push rod and with the shiftable member of the clutch, and in position to engage the crank shaft thereby to slide the crank shaft out of engagement with the hollow feed shaft when the clutch is automatically thrown into operation.

5. In a multiple spindle screw machine, the combination of a transversely located hollow feed shaft, a housing for receiving one end of said shaft, a sliding crank handle shaft projecting into said housing and having an interlocking connection with the hollow shaft, an automatically operated clutch comprising a fixed member and a relatively shiftable member, means for shifting it, a push rod carried by the hollow shaft and adapted to engage the crank shaft, means secured to said push rod and to the shiftable member of the clutch thereby to slide the crank shaft out of engagement with the hollow feed shaft when the clutch is automatically thrown into operation.

6. In a machine having a manually operated and power driven shaft, clutch mechanism for transmitting power to the shaft, means for preventing the operation of the shaft by the manually operated means when the clutch is engaged and comprising a sliding push rod having operative connection with and shifted by one member of the clutch mechanism and operative to separate the manually operative means from said shaft.

7. In a machine having a manually operated and power driven shaft, clutch mechanism for transmitting power to the shaft, means for preventing the operation of the shaft by the manually operated means when the clutch is engaged and comprising a sliding push rod carried interiorly of the shaft and having operative connection with and shifted by one member of the clutch mechanism to engage and separate the manually operative means from said shaft.

8. In a machine having an automatically operated clutch comprising a fixed and a shiftable member and means for shifting it, the combination of a feed shaft, a sliding crank handle shaft, said shafts having an interlocking connection therebetween, and means operated by the shiftable member of the clutch for shifting the crank shaft away from the feed shaft.

9. In a machine having an automatically operated clutch comprising a fixed and a shiftable member and means for shifting it, the combination of a feed shaft, a sliding crank handle shaft in alinement therewith and having an interlocking connection with said feed shaft, and sliding means connected with the shiftable member of the clutch and slidable to engage the crank shaft thereby to separate the same from the feed shaft when the clutch is automatically thrown into operation.

10. In a machine having an automatically operated clutch comprising a fixed and a shiftable member and means for shifting it, the combination of a feed shaft, a sliding crank handle shaft in alinement therewith and having an interlocking connection with said feed shaft, and sliding means comprising a push rod located interiorly of the feed shaft and connected with the shiftable member of the clutch and slidable to engage the crank shaft thereby to separate the same from the feed shaft when the clutch is automatically thrown into operation.

11. In a crank handle safety device, the combination of a manually-operated and power-driven shaft, clutch mechanism for transmitting power to the shaft and comprising a fixed member and a shiftable member, a crank handle having an interlocking connection with said shaft and endwise shiftable relatively thereto, and means connected with and operated by the shiftable member of the clutch for disengaging the crank handle from its interlocking connection with the shaft.

12. In a crank handle safety device, the combination of a manually-operated and power-driven shaft, clutch mechanism for transmitting power to the shaft and comprising a fixed member and a shiftable member, a crank handle having an interlocking connection with said shaft and endwise shiftable relatively thereto, and means comprising a sliding push rod operated by the shiftable member of the clutch for engaging said crank handle thereby to shift the same out of interlocking connection with the shaft.

13. In a crank handle safety device, the combination of a manually-operated and power-driven shaft, clutch mechanism for transmitting power to the shaft and comprising a fixed member and a shiftable member, a crank handle having an interlocking connection with said shaft and endwise shiftable relatively thereto, and means located interiorly of the shaft and operated by the shiftable member of the clutch for engaging said crank handle thereby to shift the same out of its interlocking connection with the shaft.

14. In a machine having an automatically-operated clutch comprising a fixed and a shiftable member and means for shifting it, the combination of a shaft, a crank handle having an interlocking connection with said shaft, and sliding means comprising a push rod located interiorly of the shaft and connected with the shiftable member of the clutch and slidable to engage the crank handle thereby to shift it out of interlocking engagement with the shaft when the clutch is automatically thrown into operation.

15. In a machine having an auomatically-operated clutch comprising a fixed and a shiftable member and means for shifting it, the combination of a shaft, a crank handle having an interlocking connection with said shaft, a sliding push rod connected with the shiftable member of the clutch and in position to engage the crank handle thereby to shift it out of interlocking engagement with the shaft when the clutch is thrown into operation.

16. In a crank handle safety device, the combination of a shaft, a clutch for transmitting power to the shaft comprising a fixed member and a shiftable member, a crank handle endwise shiftable relatively to said shaft and having an interlocking connection therewith for rotating it, and means located between the shiftable member of the clutch and the crank handle and directly shifted by said clutch member for severing the interlocking engagement of the crank handle with the shaft.

17. In a crank handle safety device, the combination of a shaft, a clutch on said shaft for transmitting power thereto and comprising a fixed member and a shiftable member, a crank handle endwise shiftable relatively to said shaft and having an interlocking connection therewith for rotating it, and means extending lengthwise of the shaft and connected at one end to the shiftable member of the clutch for operation thereby and in position at the opposite end to engage the crank handle and thereby shift it out of interlocking engagement with the shaft on the engagement of said clutch member.

Signed at Windsor, Vermont, this 20 day of September, 1927.

CHARLES W. SIMPSON.